United States Patent
Manzi et al.

(10) Patent No.: US 8,976,878 B2
(45) Date of Patent: Mar. 10, 2015

(54) POLYNOMIAL PHASES FOR MULTI-CARRIER MODULATION SCHEMES WITH TIME DOMAIN WINDOWING

(71) Applicant: Raytheon Company, Waltham, MA (US)

(72) Inventors: David G. Manzi, Tucson, AZ (US); Pranav Patel, Tucson, AZ (US); Kevin R. Albrecht, Oro Valley, AZ (US); Rajesh Kulkarni, Tucson, AZ (US); Michael C. Brown, Tucson, AZ (US); Sam M. Daniel, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/741,765

(22) Filed: Jan. 15, 2013

(65) Prior Publication Data

US 2014/0198864 A1    Jul. 17, 2014

(51) Int. Cl.
*H04L 27/28* (2006.01)
*H04L 27/26* (2006.01)
*H04L 27/18* (2006.01)

(52) U.S. Cl.
CPC ............ *H04L 27/2602* (2013.01); *H04L 27/18* (2013.01); *H04L 27/2627* (2013.01)
USPC ........... 375/260; 375/267; 375/270; 375/295; 375/316; 375/340

(58) Field of Classification Search
CPC ................ G02B 27/48; G02F 1/13342; G02F 1/133606; H04J 11/0023; H04J 13/0062; H04J 13/22; H04B 10/548; H04B 10/66; H04L 27/2608; H04L 27/2614; H04L 27/2602
USPC ......... 375/260, 267, 270, 271, 272, 279, 295, 375/297, 299, 306, 316, 318, 322, 338, 340, 375/346
See application file for complete search history.

(56) References Cited

U.S. PATENT DOCUMENTS

| | | | |
|---|---|---|---|
| 2006/0146951 A1* | 7/2006 | Chiu | 375/267 |
| 2007/0058693 A1* | 3/2007 | Aytur et al. | 375/130 |
| 2010/0040159 A1* | 2/2010 | Lee et al. | 375/260 |
| 2010/0166043 A1* | 7/2010 | Sasaoka et al. | 375/146 |
| 2010/0272221 A1* | 10/2010 | Walker et al. | 375/346 |
| 2011/0211541 A1* | 9/2011 | Yuk et al. | 370/329 |
| 2011/0235760 A1* | 9/2011 | Yu et al. | 375/346 |
| 2013/0071122 A1* | 3/2013 | Sasaki | 398/79 |
| 2013/0315320 A1* | 11/2013 | McGowan et al. | 375/260 |
| 2014/0146900 A1* | 5/2014 | Dabak et al. | 375/257 |

* cited by examiner

*Primary Examiner* — Hirdepal Singh
(74) *Attorney, Agent, or Firm* — Daly, Crowley, Mofford & Durkee, LLP

(57) ABSTRACT

In one aspect, a method includes performing a mapping on bits to form a complex data symbol, applying a frequency rotation mask to the complex data symbol based on a polynomial phase, performing an inverse discrete Fourier transform (IDFT) after applying the frequency rotation mask, applying a time domain window after performing the IDFT, converting digital data to analog data after applying the time window and transmitting the analog data as an analog signal.

20 Claims, 9 Drawing Sheets

POLYNOMIAL PHASES FOR MULTI-CARRIER MODULATION SCHEMES WITH TIME DOMAIN WINDOWING

BACKGROUND

Multi-carrier modulation (MCM) is a method of transmitting a bit stream by dividing the bit stream into multiple components and transmitting each component over a separate carrier signal or frequency (also called a subcarrier) from the other components. Orthogonal frequency division multiplexing (OFDM) is an MCM technique used to provide robust signaling capabilities in complex environments where the channel transfer function can exhibit significant frequency dependency. In addition, OFDM provides a simple method for arbitrary fragmentation of an available channel or a consecutive chunk of bandwidth.

SUMMARY

In one aspect, a method includes performing a mapping on bits to form a complex data symbol, applying a frequency rotation mask to the complex data symbol based on a polynomial phase, performing an inverse discrete Fourier transform (IDFT) after applying the frequency rotation mask, applying a time domain window after performing the IDFT, converting digital data to analog data after applying the time window and transmitting the analog data as an analog signal.

In another aspect, an apparatus includes electronic hardware circuitry configured to perform a mapping on bits to form a complex data symbol, apply a frequency rotation mask to the complex data symbol based on a polynomial phase, perform an inverse discrete Fourier transform (IDFT) after applying the frequency rotation mask, apply a time domain window after performing the IDFT, convert digital data to analog data after applying the time window and transmit the analog data as an analog signal.

In a further aspect, an article includes a non-transitory computer-readable medium that stores computer-executable instructions. The instructions causing a machine to perform a mapping on bits to form a complex data symbol, apply a frequency rotation mask to the complex data symbol based on a polynomial phase, perform an inverse discrete Fourier transform (IDFT) after applying the frequency rotation mask, apply a time domain window after performing the IDFT, convert digital data to analog data after applying the time window and transmit the analog data as an analog signal.

DETAILED DESCRIPTION

Described herein are techniques that use a frequency rotation mask, which ensures that a maximum sub-carrier to sub-carrier power deviation is within +/−5 dB for any arbitrary data pattern. In particular the techniques include a selection of the frequency rotation mask and the interplay of the frequency rotation mask with a windowing function used to mitigate out of band radiation.

The use of windowing functions to improve the spectral containment of OFDM waveforms is very attractive, but it often presents significant problems when applied to data streams that result in high Peak to Average Power Ratio (PAPR) OFDM frames. The result of windowing these frames is that a large number of OFDM sub-carriers in the transmitted signal will be attenuated significantly. The techniques described herein control the PAPR and reduce the negative effects of sub-carrier attenuation while allowing the use windowing functions.

Figure 1A:
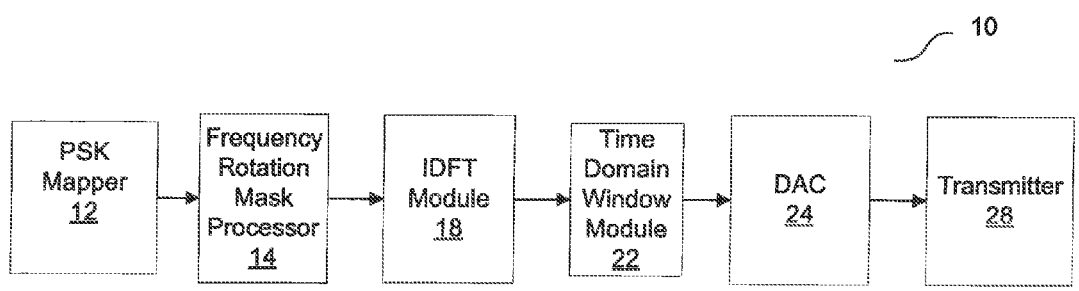
FIG. 1A is a functional block diagram of an example of a system to transmit data.

Referring to FIG. 1A, an example of a system to transmit data is a system 10. In one example, the system 10 is part of a windowed orthogonal frequency-division multiplexing (Wi-OFDM) system. The system 10 includes a phase-shift keying (PSK) mapper 12, a frequency rotation mask processor 14, an inverse discrete Fourier transform (IDFT) module 18, a time domain window module 22, a digital to analog converter (DAC) and a transmitter 28.

The PSK mapper 12 maps source bits, $S_B$, to be transmitted. In one example, the output of the PSK mapper 12 is a complex data symbol, $X_k$. After the PSK mapping, the frequency rotation mask processor 14 applies a frequency rotation mask, $e^{j\theta_k}$, to the mapped data, where $$\theta_k = \frac{2\pi(C+k)^2}{K},$$

where C is a constant and K is a randomness factor, k=0, 1, . . . , $N_{DFT}-1$ and $N_{DFT}$ is the size of the DFT and corresponds to the number of subcarriers. $\theta_k$ is an application of a polynomial phase (sometimes referred to as a polyphase) and is applied to each subcarrier. In one example, C is $$\frac{\pi}{2}.$$

C can be adjusted by a user depending on the system 10 in order to achieve better performance. The randomness factor K controls symmetry of the frequency rotation mask defined by the polynomial phases. In one example, K is $\pi^2$. The output of the frequency rotation mask processor is $X_k \cdot e^{j\theta_k}$.

The polynomial phase frequency rotation mask provides a set of phases that provide well behaved statistics, pulse compression or low probability of high PAPR/crest factor, and decoupling of energy concentration in both the time domain and the frequency domain for arbitrary subcarrier locations and for all data sequences. Use of phases that decouple time domain and frequency domain provide a simpler method compared to iterative methods that go back and forth between time domain and frequency domain to reduce PAPR. Knowledge of well-behaved statistics allows operations such as time domain windowing for spectrum containment and a tradeoff between clipping of an OFDM symbol in time domain and ICI (Inter Carrier Interference).

The IDFT module 18 converts the frequency domain into the time domain. For example, the IDFT module 18 applies a term, $$\sum_{k=0}^{N_{DFT}-1} e^{\frac{j2\pi kn}{N_{DFT}}},$$

where n=0, 1, ..., $N_{DFT}$-1. The output of the IDFT module 18 is:

$$\sum_{k=0}^{N_{DFT}-1} X_k \cdot e^{j\theta_k} \cdot e^{\frac{j2\pi kn}{N_{DFT}}}.$$

The time domain window module 22 applies a time window p(n). The output of the time domain window 22 is an OFDM symbol sample, x(n), where:

$$x(n) = p(n) \sum_{k=0}^{N_{DFT}-1} X_k \cdot e^{j\theta_k} \cdot e^{\frac{j2\pi kn}{N_{DFT}}}.$$

The OFDM symbol sample, x(n), is provided to the DAC 24 and converted to an analog signal, which is transmitted by the transmitter 28.

Figure 1B:
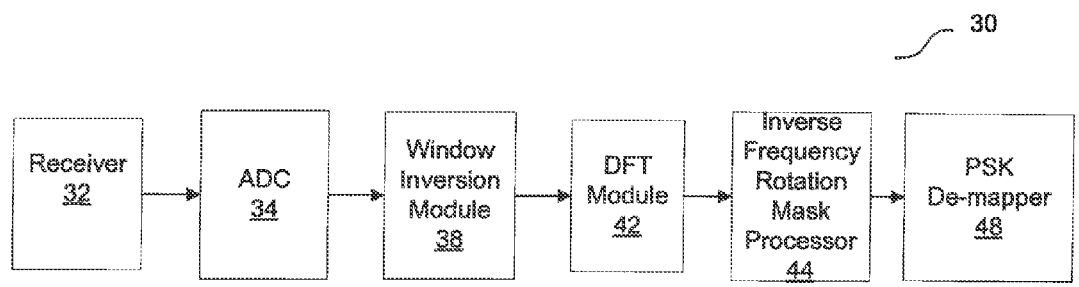
FIG. 1B is a functional block diagram of an example of a system to receive data transmitted by the system of FIG. 1.

Referring to FIG. 1B, an example of a system for receiving data transmitted from the system 10 is a system 30. In one example, the system 30 is part of a Wi-OFDM system. The system 30 includes a receiver 32, an analog to digital converter (ADC) 34, a window inversion module 38, a discrete Fourier transform (DFT) module 42, an inverse frequency rotation mask processor 44 and a PSK de-mapper 48.

The receiver 32 receives the analog signal transmitted by the system 10 and the analog signal is converted by the ADC 34 into digital data. The window inversion module 38 removes the time domain window by applying the inverse of the term applied by the time-domain window module 22. For example, the window inversion module 38 applies the term $p^{-1}(n)$.

The time domain data is converted by the DFT module 42 into the frequency domain. The DFT module 42 applies an inverse of the term applied by the IDFT module 18. For example, the DFT module 42 applies the term, $$\sum_{n=0}^{N_{DFT}-1} e^{\frac{j2\pi kn}{N_{DFT}}},$$

to the output of the window inversion module 38.

The inverse frequency rotation mask processor 44 removes the frequency rotation mask. The inverse frequency mask processor 44 applies an inverse of the term applied by the frequency rotation mask processor 14. For example, the inverse frequency mask processor 44 applies the term, $e^{j\theta_k}$.

The resultant data from the inverse frequency rotation mask processor 44 is the complex symbol, $X_k$, where:

$$X_k = \left( \sum_{n=0}^{N_{DFT}-1} p^{-1}(n) \cdot x(n) \cdot e^{\frac{-j2\pi kn}{N_{DFT}}} \right) \cdot e^{-j\theta_k}.$$

The complex symbol, $X_k$, is provided to the PSK de-mapper 48 which de-maps the data into the source bits, $S_B$.

Figure 2:
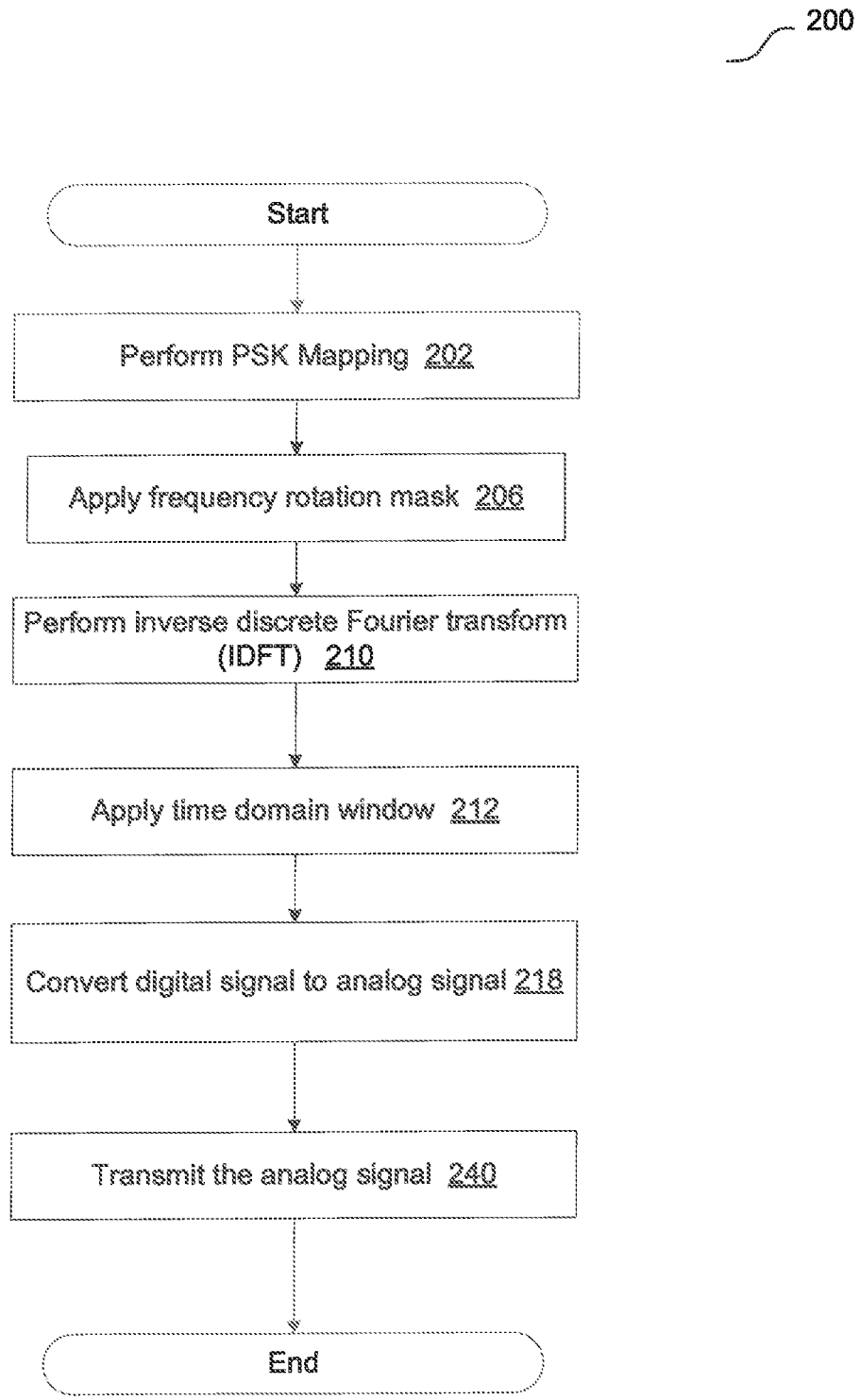
FIG. 2 is a flowchart of an example of a process to transmit data.

Referring to FIG. 2, an example of a process to transmit data is a process 200. Process 200 performs PSK mapping on source bits, $S_B$ (202) and applies a frequency rotation mask (206). Process 200 performs an inverse discrete Fourier transform (210) and applies time window (212). Process 200 converts the digital signal into an analog signal (218) and transmits the analog signal (240).

Figure 3:
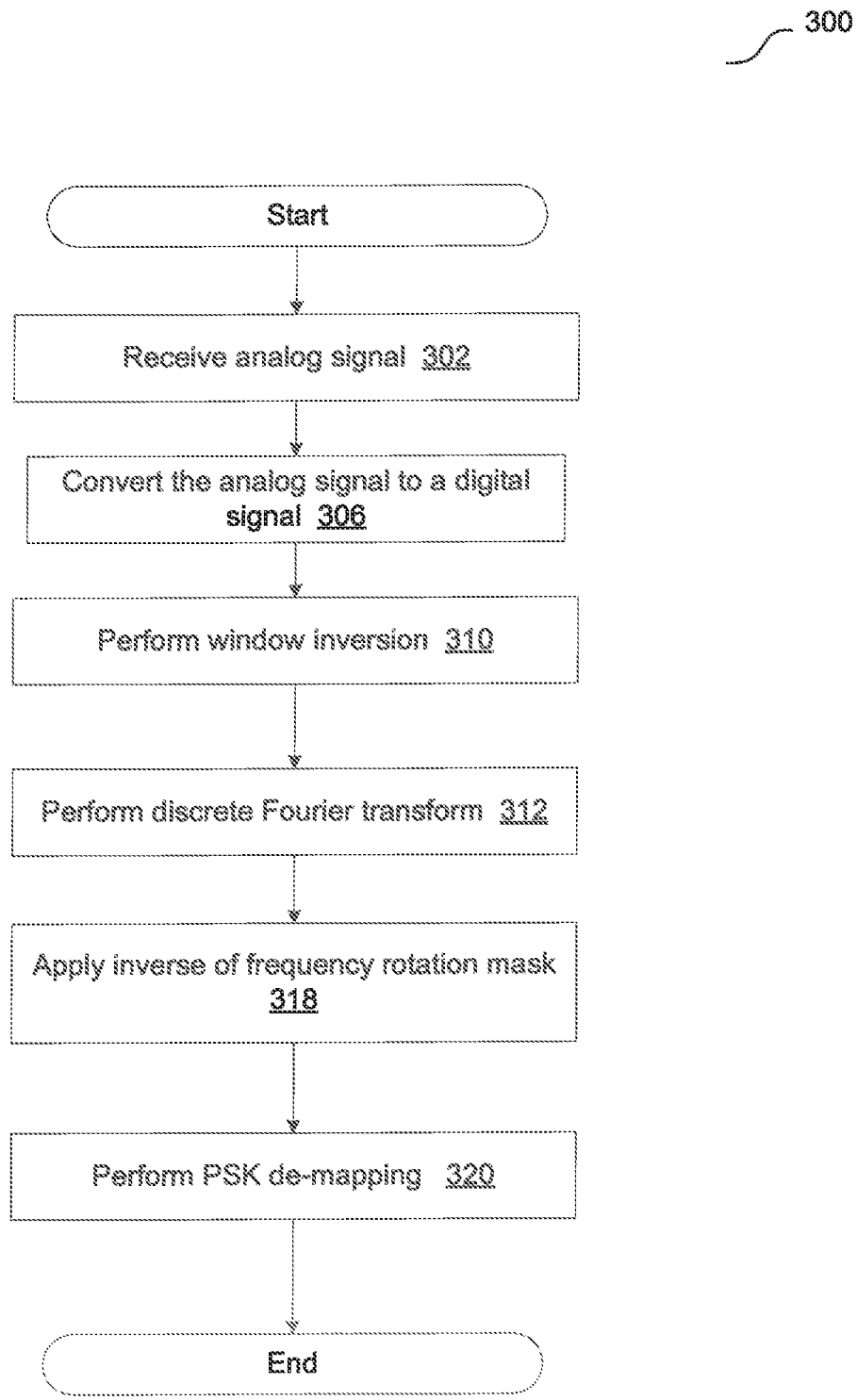
FIG. 3 is a flowchart of an example of a process to receive data.

Referring to FIG. 3, an example of a process to receive data is a process 300. Process 300 receives the analog signal (302) and converts the analog signal to a digital signal (306). Process 300 performs a window inversion and performs a discrete Fourier transform (312). Process 300 applies an inverse frequency rotation mask (318) and performs a PSK de-mapping (320) to recover the source bits, $S_B$, processed by the system 10.

Figure 4A:
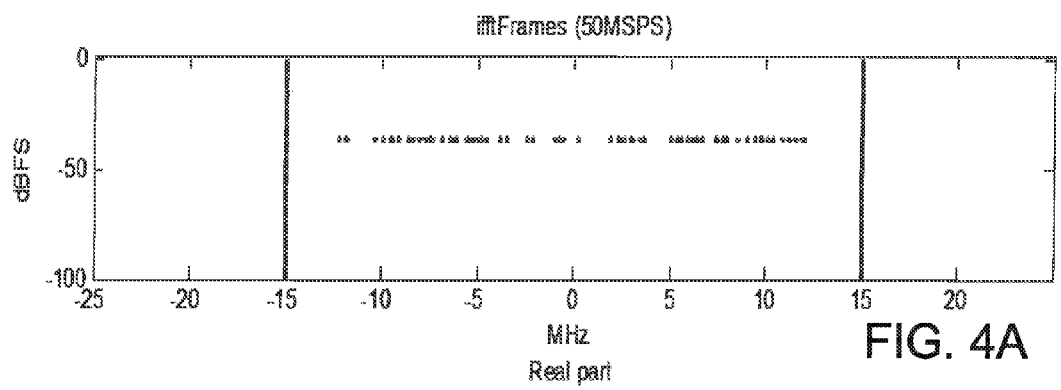
FIGS. 4A to 4C are graphs of fast Fourier transform (FFT) frames and real and imaginary time domain data without using a frequency rotation mask.
Figure 4B:
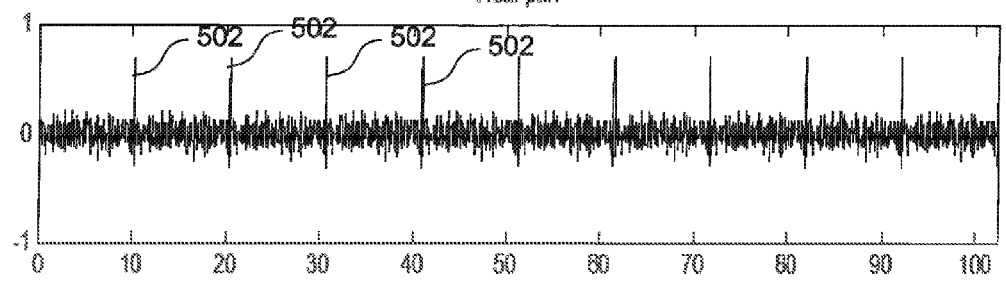
Figure 4C:
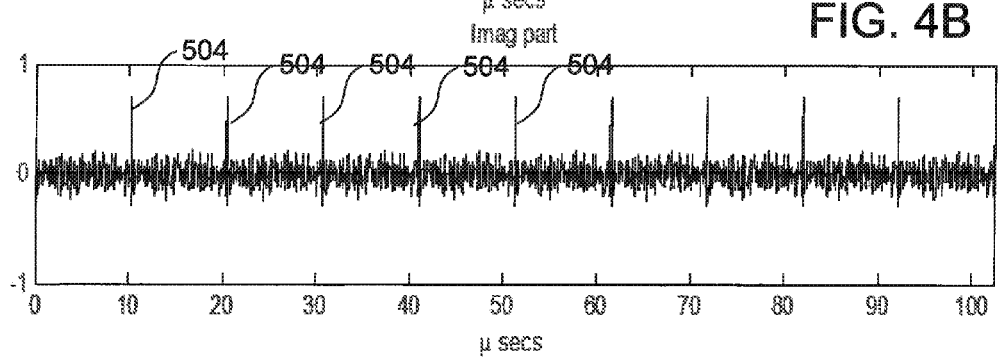

Referring to FIGS. 4A to 4C, by not applying a frequency rotation mask unacceptable signal dynamics or high PAPR signal characteristic appears in the time domain due to coherent addition of subcarrier signals. For example, FIG. 4A is a graph of a signal in the frequency domain. In the time domain, unwanted signals appear as large magnitude peaks such as peaks 502 in the real part (FIG. 4B) and peaks 504 in the imaginary part (FIG. 4C). To correctly receive a signal, distortionless transmission is required. In order to avoid transmission-side distortion, the system will need to use expensive linear components on the transmitter-side. In addition, these peaks contain a majority of signal energy which time domain windowing may significantly reduce.

Figure 4D:
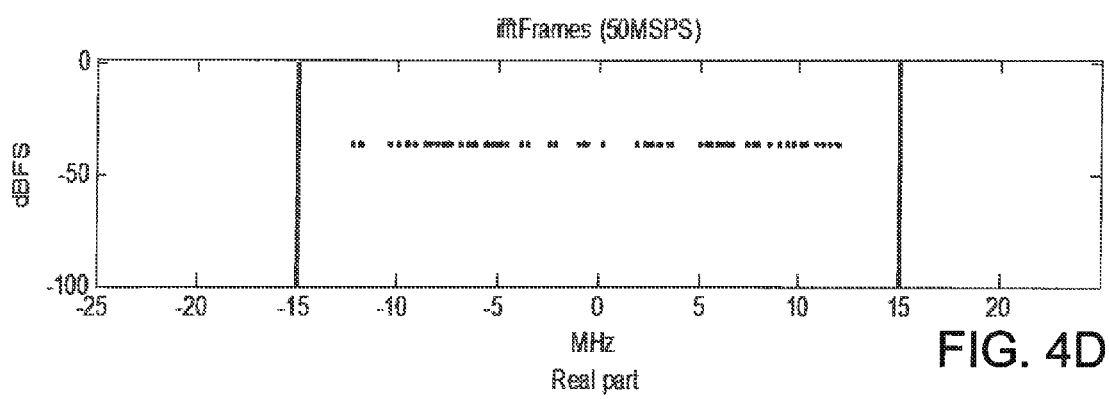
FIG. 4D to 4F are graphs of FFT frames and real and imaginary time domain data using a frequency rotation mask.
Figure 4E:
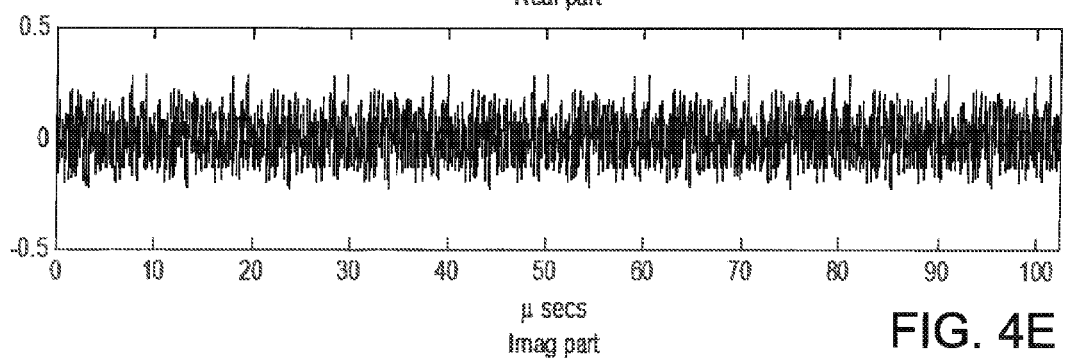
Figure 4F:
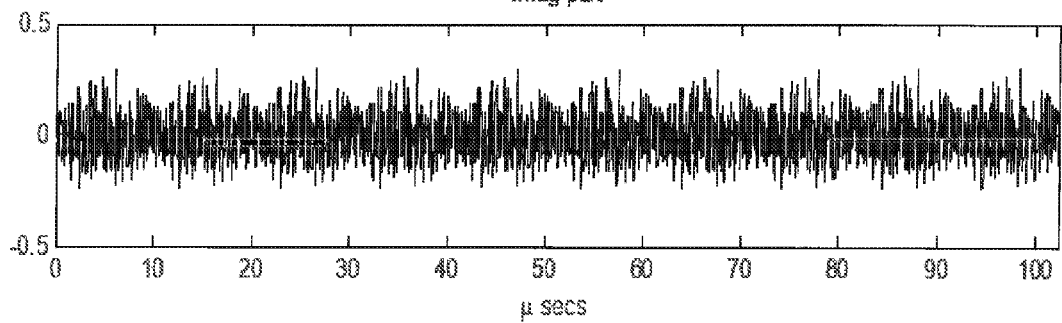

Referring to FIGS. 4D to 4F, by applying a frequency rotation mask with a randomness factor, unwanted signal characteristics do not appear in the time domain because each subcarrier is random enough such that the subcarriers are added together incoherently. For example, FIG. 4D is a graph of a signal in the frequency domain, which is the same as FIG. 4A. In the time domain, the unwanted signal characteristics do not appear in the real part (FIG. 4E) and in the imaginary part (FIG. 4F). As can be observed from the associated figures, signal dynamics is lot more constrained and energy distribution is also greatly increased. This constrained signal dynamics greatly reduce required linearity of a transmit-side system's components. At the same time, increased energy distribution minimizes transmit side energy reduction due to time domain windowing.

Figure 5A:
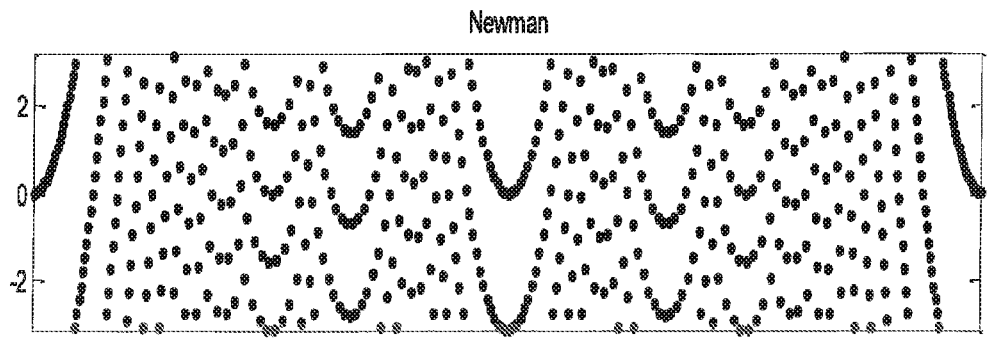
FIGS. 5A to 5C are graphs comparing Newman, Narahashi-Nojima and polynomial frequency rotation masks.
Figure 5B:
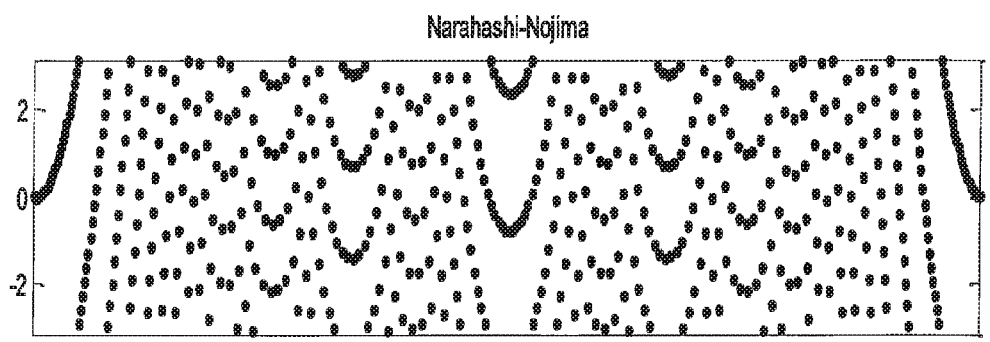
Figure 5C:
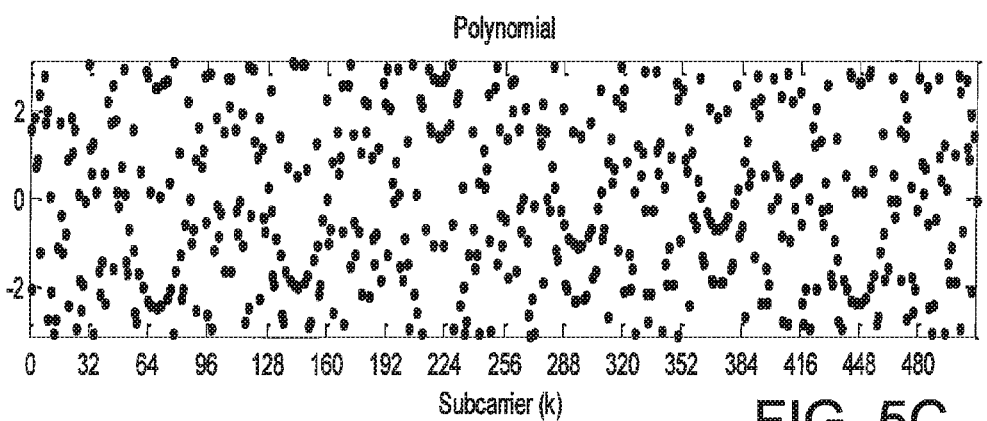

Referring to FIG. 5A to FIG. 5C, by a having randomness factor, the polynomial phase frequency rotation mask is superior to other forms of frequency rotation masks. For example, FIG. 5A depicts using a Newman frequency rotation mask, where $$\theta_k = \frac{\pi k^2}{N_{DFT}},$$

and FIG. 5B depicts using a Narahashi-Nojima frequency rotation mask over the same subcarrier range as FIG. 5A, where $$\theta_k = \frac{\pi(k-1)(k-2)}{N_{DFT}-1}.$$

The graphs in FIGS. 5A and 5B are approximately the same and both figures illustrate the lack of randomness over a wide subcarrier range. Whereas the graph in FIG. 5C, which depicts a frequency rotation mask having a polynomial phase, is more random over the same subcarrier range as FIGS. 5A and 5B because the $\theta_k$ in the polynomial phase includes the randomness factor K which make these phases asymmetrical or random for a given subcarrier range.

Figure 6A:
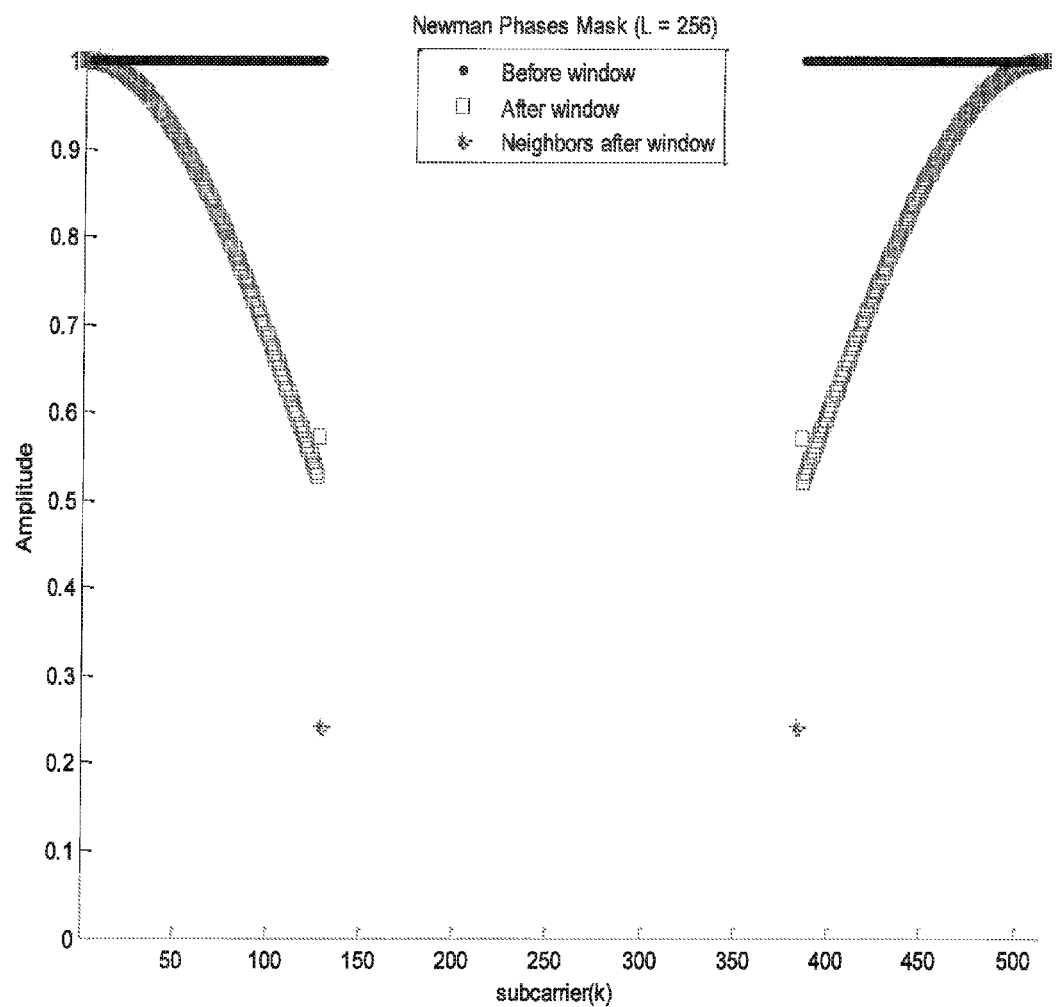
FIG. 6A is a graph using a Newman mask transmitting all 1's before and after a time-domain window.
Figure 6B:
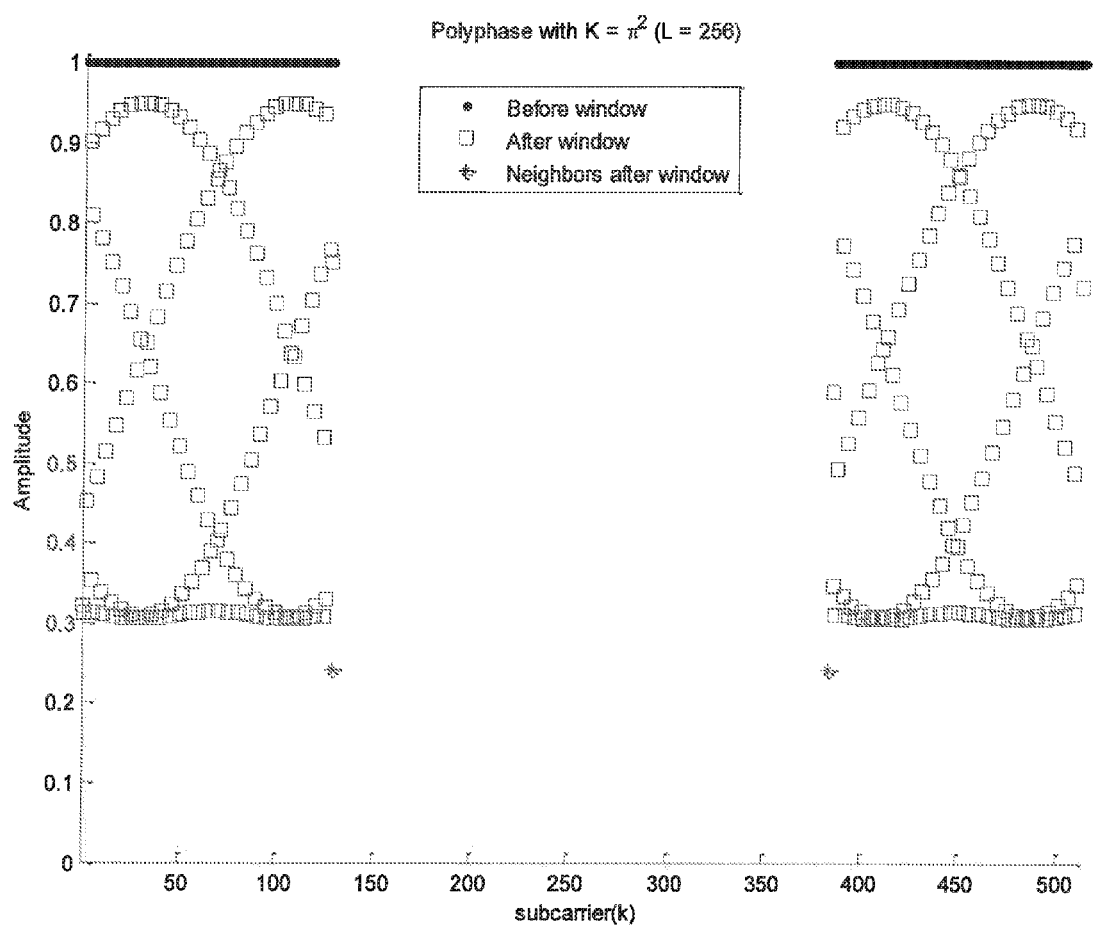
FIG. 6B is a graph using a polynomial mask transmitting all 1's before and after a time-domain window.

Referring to FIGS. 6A and 6B, the polynomial phases are superior to the other phases including the Newman phases. Note that these figures are in frequency domain and the Hamming window was used for a time-domain window operation. FIG. 6A is a graph that depicts sending a bit stream of all 1s using a Newman phases mask before a time-domain window and after a time-domain window. After a time-domain window, there is a reduction in amplitude of the signal. However, a graph in FIG. 6B depicts a bit stream of all 1s using a polynomial phase mask before a time-domain window and after a time-domain window, but shows well-behaved and acceptable loss of amplitude of the signal after the time-domain window. All 1s sequence represents the worst case and it is observed that the polynomial phases guarantee that the maximum sub-carrier to sub-carrier power deviation is within +/−5 dB for any arbitrary data pattern. This is a significant improvement over +/−15 dB deviation observed for the Newman phases.

Figure 7:
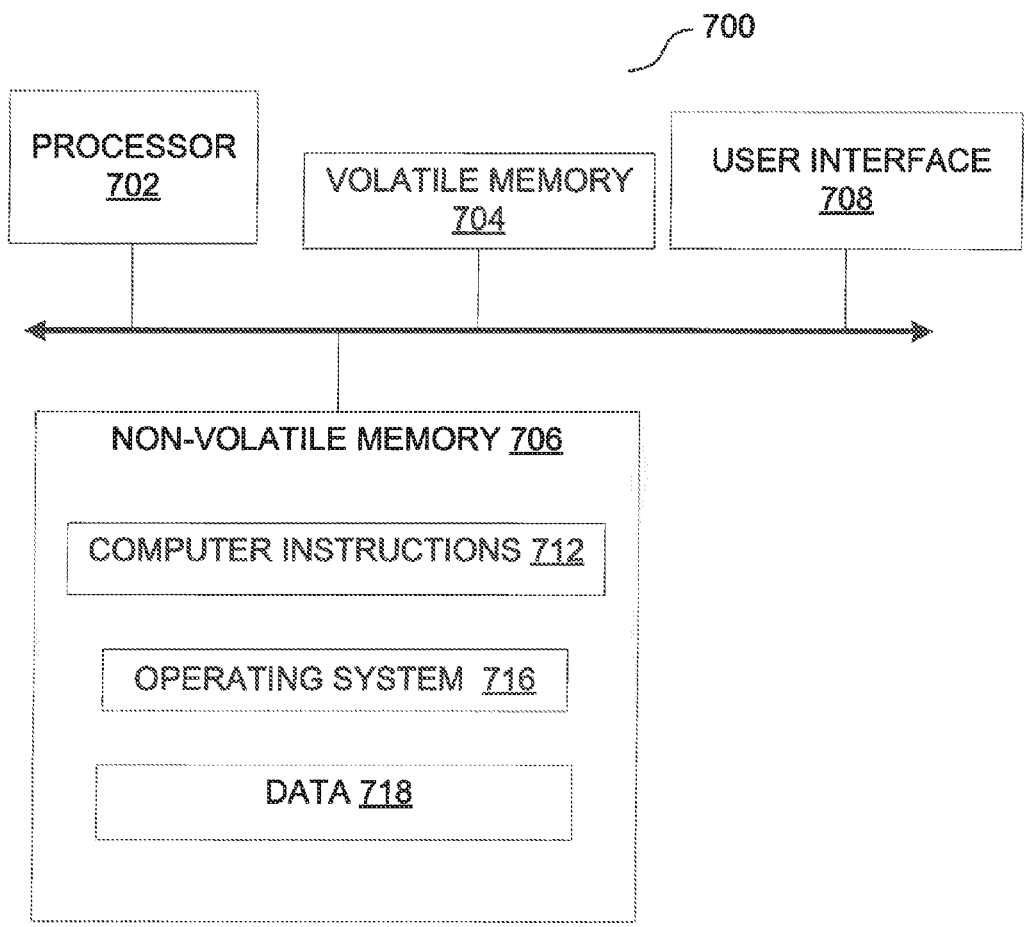
FIG. 7 is a computer on which the processes of FIGS. 2 and 3 may be implemented.

Referring to FIG. 7, in one example, the system 10 and/or the system 30 may be a computer such as a computer 700. The computer 700 includes a processor 702, a volatile memory 704, a non-volatile memory 706 (e.g., hard disk) and the user interface (UI) 708 (e.g., a graphical user interface, a mouse, a keyboard, a display, touch screen and so forth). The non-volatile memory 706 stores computer instructions 712, an operating system 716 and data 718. In one example, the computer instructions 712 are executed by the processor 702 out of volatile memory 704 to perform all or part of the processes described herein (e.g., processes 200 and 300).

The processes described herein (e.g., processes 200 and 300) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200 and 300 are not limited to the specific processing order of FIGS. 2 and 3, respectively. Rather, any of the processing blocks of FIGS. 2 and 3 may be re-ordered, combined or removed, performed in parallel or in serial, as necessary, to achieve the results set forth above.

The processing blocks (for example, in the processes 200 and 300) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:
1. A method comprising:
performing a mapping on bits to form a complex data symbol;
applying a frequency rotation mask to the complex data symbol based on a polynomial phase;
performing an inverse discrete Fourier transform (IDFT) after applying the frequency rotation mask;
applying a time domain window after performing the IDFT;
converting digital data to analog data after applying the time window; and
transmitting the analog data as an analog signal,
wherein applying a frequency rotation mask to the complex data symbol based on polynomial phases comprises applying a frequency rotation mask to the complex data symbol based on a polynomial phase comprising a randomness factor.

2. The method of claim 1, further comprising:
receiving the analog signal;
converting the analog signal to a digital signal;
performing a window inversion on the digital signal;
performing a discrete Fourier transform (DFT) to form time domain data after performing the window inversion;
applying an inverse of the frequency rotation mask on the time domain data to form the complex data symbol; and
performing a demapping to convert the complex data symbol into the bits.

3. The method of claim 1 wherein applying, to the mapped source bits, a frequency rotation mask based on polynomial phases comprising a randomness factor comprises applying a frequency rotation mask to the complex data symbol based on a polynomial phase comprising a randomness factor of $\pi^2$.

4. The method of claim 1 wherein performing a mapping on bits to form a complex data symbol comprises performing phase-shift keying (PSK) mapping on bits to form a complex data symbol.

5. A method comprising:
performing a mapping on bits to form a complex data symbol;
applying a frequency rotation mask to the complex data symbol based on a polynomial phase;
performing an inverse discrete Fourier transform (IDFT) after applying the frequency rotation mask;
applying a time domain window after performing the IDFT;
converting digital data to analog data after applying the time window; and
transmitting the analog data as an analog signal,
wherein applying, to the mapped source bits, a frequency rotation mask based on polynomial phases comprises applying a frequency rotation mask to the complex data symbol based on a polynomial phase comprising $e^{j\Theta_k}$, where $$\theta_k = \frac{2\pi(C+k)^2}{K},$$

C is a constant and K is a randomness factor, k=0, 1, ..., $N_{DFT}$−1 and $N_{DFT}$ is the size of a discrete Fourier transform.

6. The method of claim 5 wherein applying, to the mapped source bits, a frequency rotation mask based on polynomial phases comprising a randomness factor comprises applying a frequency rotation mask to the complex data symbol based on a polynomial phase comprising a randomness factor of $\pi^2$.

7. An apparatus, comprising:
electronic hardware circuitry configured to:
perform a mapping on bits to form a complex data symbol;
apply a frequency rotation mask to the complex data symbol based on a polynomial phase;
perform an inverse discrete Fourier transform (IDFT) after applying the frequency rotation mask;
apply a time domain window after performing the IDFT;
convert digital data to analog data after applying the time window; and
transmit the analog data as an analog signal,
wherein the circuitry to apply a frequency rotation mask to the complex data symbol based on polynomial phases comprises circuitry configured to apply a frequency rotation mask to the complex data symbol based on a polynomial phase comprising a randomness factor.

8. The apparatus of claim 7 wherein the circuitry comprises at least one of a processor, a memory, a programmable logic device or a logic gate.

9. The apparatus of claim 7, further comprising circuitry configured to:
receive the analog signal;
convert the analog signal to a digital signal;
perform a window inversion on the digital signal;
perform a discrete Fourier transform (DFT) to form time domain data after performing the window inversion;
apply an inverse of the frequency rotation mask on the time domain data to form the complex data symbol; and
perform a demapping to convert the complex data symbol into the bits.

10. The apparatus of claim 7 wherein the circuitry to apply, to the mapped source bits, a frequency rotation mask based on polynomial phases comprising a randomness factor comprises circuitry configured to apply a frequency rotation mask to the complex data symbol based on a polynomial phase comprising a randomness factor of $\pi^2$.

11. The apparatus of claim 7 wherein the circuitry to perform a mapping on bits to form a complex data symbol comprises circuitry configured to perform phase-shift keying (PSK) mapping on bits to form a complex data symbol.

12. The apparatus of claim 7 wherein the circuitry to apply, to the mapped source bits, a frequency rotation mask based on polynomial phases comprises circuitry configured to apply a frequency rotation mask to the complex data symbol based on a polynomial phase comprising $e^{j\Theta_k}$, where $$\theta_k = \frac{2\pi(C+k)^2}{K},$$

C is a constant and K is a randomness factor, k=0, 1, ..., $N_{DFT}$−1 and $N_{DFT}$ is the size of a discrete Fourier transform.

13. An article comprising:
a non-transitory computer-readable medium that stores computer-executable instructions, the instructions causing a machine to:
perform a mapping on bits to form a complex data symbol;
apply a frequency rotation mask to the complex data symbol based on a polynomial phase;
perform an inverse discrete Fourier transform (IDFT) after applying the frequency rotation mask;
apply a time domain window after performing the IDFT;
convert digital data to analog data after applying the time window; and
transmit the analog data as an analog signal,
wherein the instructions causing the machine to apply a frequency rotation mask to the complex data symbol based on polynomial phases comprises instructions causing the machine to apply a frequency rotation mask to the complex data symbol based on a polynomial phase comprising a randomness factor.

14. The article of claim 13, further comprising computer-executable instructions causing the machine to:
receive the analog signal;
convert the analog signal to a digital signal;

perform a window inversion on the digital signal;
perform a discrete Fourier transform (DFT) to form time domain data after performing the window inversion;
apply an inverse of the frequency rotation mask on the time domain data to form the complex data symbol; and
perform a demapping to convert the complex data symbol into the bits.

15. The article of claim 13 wherein the instructions causing the machine to apply, to the mapped source bits, a frequency rotation mask based on polynomial phases comprising a randomness factor comprises instructions causing the machine to apply a frequency rotation mask to the complex data symbol based on a polynomial phase comprising a randomness factor of $\pi^2$.

16. The article of claim 13 wherein the instructions causing the machine to perform a mapping on bits to form a complex data symbol comprises instructions causing the machine to perform phase-shift keying (PSK) mapping on bits to form a complex data symbol.

17. The article of claim 13 wherein the instructions causing the machine to apply, to the mapped source bits, a frequency rotation mask based on polynomial phases comprises instructions causing the machine to apply a frequency rotation mask to the complex data symbol based on a polynomial phase comprising $e^{j\theta_k}$, where $$\theta_k = \frac{2\pi(C+k)^2}{K},$$

C is a constant and K is a randomness factor, k=0, 1, ..., $N_{DFT}-1$ and $N_{DFT}$ is the size of a discrete Fourier transform.

18. A method comprising:
performing a mapping on bits to form a complex data symbol;
applying a frequency rotation mask to the complex data symbol based on a polynomial phase;
performing an inverse discrete Fourier transform (IDFT) after applying the frequency rotation mask;
applying a time domain window after performing the IDFT;
converting digital data to analog data after applying the time window; and
transmitting the analog data as an analog signal,
wherein applying a frequency rotation mask to the complex data symbol based on a polynomial phase comprises applying a frequency rotation mask to the complex data symbol based on a polynomial phase to enable that a maximum sub-carrier to sub-carrier power deviation is within +/−5 dB for any arbitrary data pattern.

19. The method of claim 18, further comprising:
receiving the analog signal;
converting the analog signal to a digital signal;
performing a window inversion on the digital signal;
performing a discrete Fourier transform (DFT) to form time domain data after performing the window inversion;
applying an inverse of the frequency rotation mask on the time domain data to form the complex data symbol; and
performing a demapping to convert the complex data symbol into the bits.

20. The method of claim 18 wherein applying, to the mapped source bits, a frequency rotation mask based on polynomial phases comprising a randomness factor comprises applying a frequency rotation mask to the complex data symbol based on a polynomial phase comprising a randomness factor of $\pi^2$.

* * * * *